H. P. BENTON.
Lamp.
No. 3,040.
Patented April 10, 1843.
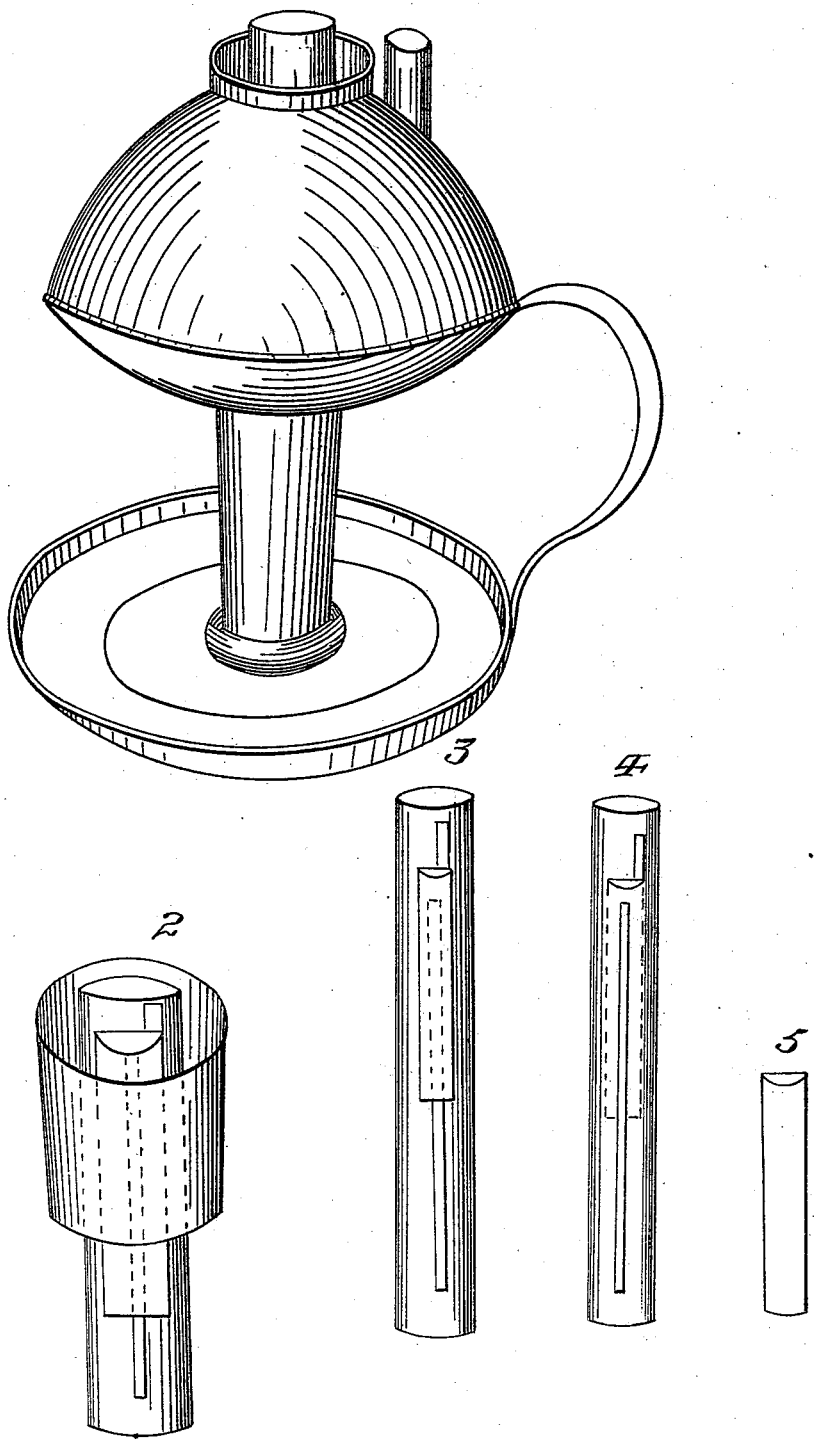

UNITED STATES PATENT OFFICE.

H. P. BENTON, OF NORWALK, OHIO.

LARD-LAMP.

Specification of Letters Patent No. 3,040, dated April 10, 1843.

*To all whom it may concern:*

Be it known that I, H. P. BENTON, of Norwalk, in the county of Huron and State of Ohio, have invented a new and Improved Lamp for Burning Hog's Lard for Lights; and I do hereby declare that the following is a full and exact description of the same, reference being had to the annexed drawings, making a part of this specification in which—

Figure 1 is a perspective view of the whole of said lamp.

Fig. 2 represents the cup or cylinder heater, in the center of which is the tube containing the wick, passing down through the bottom to which it is closely fitted and soldered. This cylinder heater serves to melt the lard and keep it in a liquid state. It receives its heat from the blaze by radiation, and communicates it to the surrounding lard in the magazine. The cylinder heater is about two inches in depth and about one and a half inches in diameter, closed at the bottom so that no oil can enter it from below. The relative situations of the tube containing the wick, with one of the side tubes, is represented in this figure.

Fig. 3 represents the wick tube in connection with one of the side tubes which are soldered to it directly over the long aperture, through which the lard is admitted into said tube. These side tubes form a channel by which the lard may rise up and enter the wick tube near the top without entering the cylinder heater.

Fig. 4 represents the wick tube with its long opening for the admission of the lard into the wick. The dotted lines show the situation of the side tubes. The wick tube is about four inches in length, three fourths of an inch wide and one eighth of an inch thick, with a long aperture from the bottom nearly to the top, for the admission of lard, and a small aperture near the top for the convenience of raising the wick, said tube is closed at the bottom.

Fig. 5 represents the side tube one of which is placed on each side of the wick tube. They extend from below the bottom of the cylinder heater, to within half an inch of the top. They are about two inches in length, closed at the top and open at the bottom to admit the lard. In shape they are halves of a cylinder bisected from end to end. There is a small tube attached to the top as represented in Fig. 1 for the convenience of filling the lamp; the lard being first heated, and then poured in through this tube. The cylinder heater is closely fitted into the top of the lamp but can be taken out at pleasure; the wick tube extending down into the hollow column which connects the upper part of the lamp with the bottom. There is a handle, one end of which is attached to the body of the lamp and the other to the bottom. The bottom is similar to that of a common brass candlestick.

Said lamp may be constructed of tin, brass, or copper.

For a more particular description of the construction of said lamp reference is made to the annexed drawings.

I disclaim as being my invention the bottom of said lamp, the small tube for filling the lamp, the handle, and the reservoir containing the lard.

What I claim as my invention and desire to secure by Letters Patent, is—

The long flat tube containing the wick in combination with the two side tubes attached to each side of the wick tube and in combination therewith the cylinder heater in the center of which, stands the wick tube, all as described.

H. P. BENTON.

In presence of—
JOHN KENNAN,
DAVID HIGGINS.